(12) United States Patent
Spitaletta

(10) Patent No.: US 11,998,154 B1
(45) Date of Patent: Jun. 4, 2024

(54) INTERCHANGEABLE CLEANING IMPLEMENT SYSTEM AND STORAGE ARRANGEMENT THEREFOR

(71) Applicant: The Fifty/Fifty Group, Inc., Hackensack, NJ (US)

(72) Inventor: Charles Spitaletta, Mahwah, NJ (US)

(73) Assignee: The Fifty/Fifty Group, Inc., Hackensack, NJ (US)

( * ) Notice: Subject to any disclaimer, the term of this patent is extended or adjusted under 35 U.S.C. 154(b) by 523 days.

(21) Appl. No.: 17/177,796

(22) Filed: Feb. 17, 2021

Related U.S. Application Data

(60) Provisional application No. 62/982,486, filed on Feb. 27, 2020.

(51) Int. Cl.
*A47L 13/512* (2006.01)
*F16M 13/02* (2006.01)

(52) U.S. Cl.
CPC .......... *A47L 13/512* (2013.01); *F16M 13/02* (2013.01)

(58) Field of Classification Search
CPC .... A47F 7/0021; A47F 7/0028; A47F 7/0035; A47L 13/51; A47L 13/512; B25H 3/00; F16M 13/02
USPC ......... 211/60.1, 62, 63, 68, 70.1, 70.2, 70.6, 211/70.8, 87.01; 248/49, 58, 62, 65, 248/68.1, 74.1, 110, 111, 113, 682, 685, 248/686, 689, 691, 693
See application file for complete search history.

(56) References Cited

U.S. PATENT DOCUMENTS

| | | | | |
|---|---|---|---|---|
| 496,563 | A * | 5/1893 | Gulich et al. | A47L 13/512 248/113 |
| 586,238 | A * | 7/1897 | King | A47K 1/09 248/113 |
| 1,089,702 | A * | 3/1914 | Henze | A47L 13/512 248/113 |
| 1,227,208 | A * | 5/1917 | Selvine | A47L 13/512 248/113 |
| 1,793,320 | A * | 2/1931 | Horn | A47L 13/512 248/113 |
| 2,020,274 | A * | 11/1935 | Bateman | A47L 13/512 248/113 |

(Continued)

FOREIGN PATENT DOCUMENTS

| | | | | |
|---|---|---|---|---|
| DE | 29805778 U1 * | 9/1999 | | A47G 25/0678 |
| DE | 202011100193 U1 * | 8/2011 | | A47L 13/512 |

*Primary Examiner* — Joshua E Rodden
(74) *Attorney, Agent, or Firm* — Richard M. Goldberg

(57) ABSTRACT

An arrangement for interchangeably storing cleaning implements, includes a plurality of cleaning implements, each having a cleaning head and a handle attached to the cleaning head, a base adapted to be secured to a wall, and a plurality of cleaning implement attachments for securement to the base in a desired orientation, each cleaning implement attachment including a base securing section for securing the cleaning implement attachment to the base, and an implement securing section fixed to the base securing section for removably engaging with one handle to removably secure each cleaning implement to the base, the implement securing section having a first section with a spring biased button and the handle having a hollow section for sliding over the first section and having an opening in a side wall thereof, for receiving the spring biased button when the second hollow section is slid over the first section.

13 Claims, 15 Drawing Sheets

(56) References Cited

U.S. PATENT DOCUMENTS

| | | | | |
|---|---|---|---|---|
| 2,587,226 A * | 2/1952 | Rodman | .................. | B25H 3/04 211/65 |
| 2,661,920 A * | 12/1953 | Gochenour | ........... | A47L 13/512 248/113 |
| 2,898,657 A * | 8/1959 | Longfellow | .............. | B25H 3/04 248/113 |
| 2,904,188 A * | 9/1959 | Richardson | ........... | A47L 13/512 211/65 |
| 3,063,569 A * | 11/1962 | Huber | .................. | A47L 13/512 211/89.01 |
| 3,096,960 A * | 7/1963 | Kinney | ................. | A47L 13/512 248/314 |
| 3,468,508 A * | 9/1969 | Huver | .................. | A47B 81/005 248/314 |
| 3,946,877 A * | 3/1976 | Galicia | .................... | A47K 1/09 211/89.01 |
| 4,286,717 A * | 9/1981 | Liesinger | ................. | B25H 3/04 211/89.01 |
| 4,597,496 A * | 7/1986 | Kaplan | .................... | B25H 3/04 211/89.01 |
| 4,905,951 A * | 3/1990 | Putness | .................... | B25H 3/04 248/113 |
| 5,097,966 A * | 3/1992 | Miller | .................. | A47B 81/005 211/70.6 |
| 5,165,629 A * | 11/1992 | Breveglieri | .............. | B25H 3/04 248/113 |
| 5,411,191 A * | 5/1995 | Bunn, Jr. | ............... | A47F 7/0021 248/314 |
| 5,435,473 A * | 7/1995 | Larkum | .................... | B60R 9/08 211/70.8 |
| 6,669,031 B1 * | 12/2003 | Badonic | .................... | A47K 1/09 211/89.01 |
| 7,445,129 B2 * | 11/2008 | Lin | ........................ | F16M 13/02 211/60.1 |
| 8,833,717 B1 * | 9/2014 | Holmes | .................. | F16M 13/00 211/113 |
| 9,764,460 B2 * | 9/2017 | Winnard | .................. | B25H 3/04 |
| 10,136,767 B2 * | 11/2018 | Hurley | ...................... | A47K 5/18 |
| 11,229,999 B2 * | 1/2022 | Fairbrother | ........... | A47L 13/512 |
| 2005/0184014 A1 * | 8/2005 | Lin | ........................ | B25H 3/04 211/70.6 |
| 2005/0269275 A1 * | 12/2005 | Lin | ........................ | B25H 3/04 211/70.6 |
| 2013/0292532 A1 * | 11/2013 | Mikes | ...................... | F16B 7/10 248/314 |
| 2014/0001325 A1 * | 1/2014 | Friesch | .................. | A63B 60/60 248/231.9 |
| 2014/0001329 A1 * | 1/2014 | Chung | .................. | A47F 5/0006 248/231.91 |
| 2017/0210003 A1 * | 7/2017 | Kopans | .................... | F16B 45/00 |

* cited by examiner

INTERCHANGEABLE CLEANING IMPLEMENT SYSTEM AND STORAGE ARRANGEMENT THEREFOR

BACKGROUND OF THE INVENTION

The present invention relates generally to an interchangeable cleaning implement system and a storage arrangement therefor.

When cleaning houses, offices and the like, it is necessary to utilize a plurality of cleaning implements, such as a wet mop, dry mop, broom and duster. This, however, requires that each cleaning implement be a separate large implement with its own elongated handle, increasing the cost thereof.

In addition, with such a system, it is necessary to provide storage for each of the cleaning implements, which takes up a large amount of space and does not render the cleaning implements readily available.

SUMMARY OF THE INVENTION

The present invention provides an interchangeable cleaning implement system in which a single handle is provided, with the different cleaning implements, such as a wet mop, dry mop, broom and duster, being interchangeably connected with the single handle.

More importantly, the present invention provides for a unique storage arrangement for storing the single handle and the plurality of interchangeable cleaning implements on a single rack which provides for compact storage and easy accessability of the different cleaning implements that can be interchanged on the single handle.

In accordance with an aspect of the present invention, an arrangement for interchangeably storing cleaning implements of the type having a cleaning head and a handle attached to the cleaning head, includes a base adapted to be secured to a wall, and a plurality of cleaning implement attachments adapted to be secured to the base in a desired one of a plurality of orientations. Each cleaning implement attachment includes a base securing section for securing the cleaning implement attachment to the base, and an implement securing section fixed to the base securing section for removably engaging with the handle of one cleaning element to removably secure the one cleaning implement to the base.

Either the handle or the implement securing section has a first hollow section with a first opening in a side wall thereof, with a spring biased button in the first opening, and the other of the handle or the implement securing section has a second hollow section for sliding over the first hollow section, the second hollow section having a second opening in a side wall thereof, for receiving the spring biased button when the second hollow section is slid over the first hollow section.

Preferably, each implement securing section includes the first hollow section, the first opening and the spring biased button, and each handle includes the second hollow section and the second opening.

The first hollow section includes a spring element formed in the first opening in a cantilevered manner, with the button formed at a free end of the spring element. The button protrudes outwardly from the spring element.

The base includes a plurality of spaced apart openings therein, and each base securing section includes a protuberance for fitting within a respective opening in the base. The openings in the base and the protuberances are preferably dimensioned such that each protuberance fits in a respective opening of the base with a friction fit. In this regard, each opening in the base preferably includes raised sections along an inner wall thereof for frictionally engaging with the protuberance.

Each base securing section includes a supporting wall to which the respective protuberance is mounted, and a through bore extends through the supporting wall and protuberance for receiving a fastening element therethrough which is adapted to extend through a respective opening of the base to secure the base securing section to the base and to the wall, after the cleaning implement attachment has been oriented in a desired one of the plurality of orientations relative to the base.

The base further includes a hook extending outwardly from a front face thereof.

Preferably, the implement securing section extends at an angle from the base securing section, and more preferably, the angle is 90°.

The cleaning elements are selected from one of the following: a wet mop head, a dry mop head, a duster head and a broom head. An elongated handle adapted to be secured to any of the cleaning elements.

In accordance with another aspect of the present invention, an arrangement for interchangeably storing cleaning implements, includes a plurality of cleaning implements, each having a cleaning head and a handle attached to the cleaning head, a base adapted to be secured to a wall, and a plurality of cleaning implement attachments adapted to be secured to the base in a desired one of a plurality of orientations. Each cleaning implement attachment includes a base securing section for securing the cleaning implement attachment to the base, and an implement securing section fixed to the base securing section for removably engaging with the handle of one cleaning element to removably secure the one cleaning implement to the base.

Each implement securing section has a first hollow section with a first opening in a side wall thereof, with a spring biased button in the first opening, and each handle has a second hollow section for sliding over the first hollow section, the second hollow section having a second opening in a side wall thereof, for receiving the spring biased button when the second hollow section is slid over the first hollow section.

The first hollow section includes a spring element formed in the first opening in a cantilevered manner, with the button formed at a free end of the spring element.

The handle includes at least one projection at an inner wall thereof at a position below the second opening, and the implement securing section has a lower edge with at least one recess for engaging the at least one projection to further stabilize the handle in the implement securing section.

The above and other objects, features and advantages of the invention will become readily apparent from the following detailed description thereof which is to be read in connection with the accompanying drawings.

DETAILED DESCRIPTION

Figure 17:
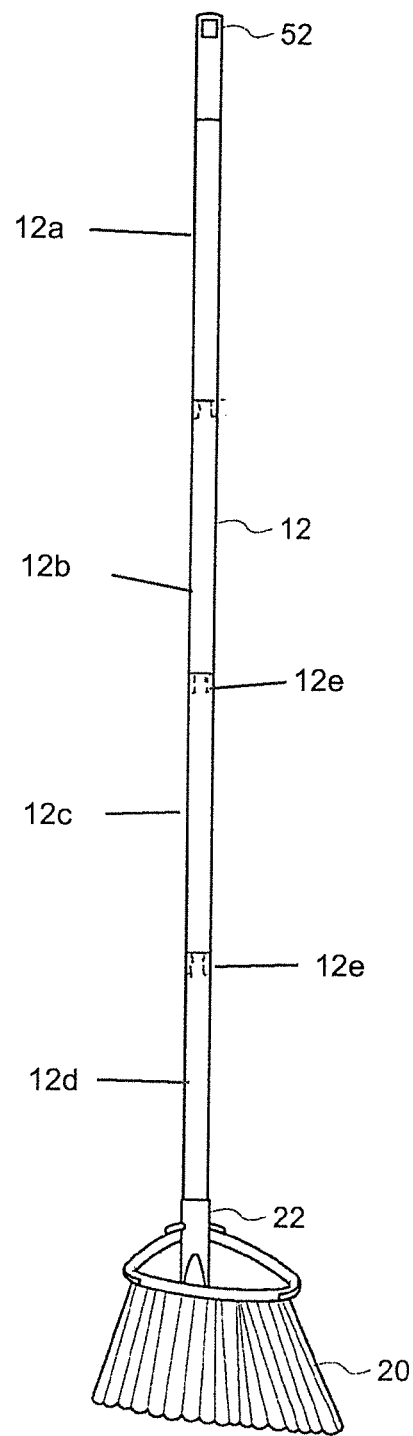
FIG. 17 is a front elevational view of the angle broom head secured to the single elongated handle.

Referring to the drawings in detail, the present invention provides an interchangeable cleaning implement system 10 which includes a single elongated handle 12. Single elongated handle 12 can be formed by a plurality of handle elements 12a, 12b, 12c and 12d (FIG. 17) which telescopically and removably snap into each other to form single elongated handle 12 as an elongated handle. In this regard, the lower ends of each handle element has a narrower section 12e (FIG. 17) which telescopically and frictionally fits into the upper end of the next lower handle element.

A plurality of cleaning implements 13 are provided, including, but not limited to, a microfiber deck mop head 14 for wet mopping, a microfiber duster head 16 for dusting and which picks up fine dirt, dust and particles, a microfiber flat mop head 18 for dry and damp cleaning and dusting and which picks up dirt, dust and hair on hardwood, tile and vinyl flooring, and an angle broom head 20 for sweeping. Broom head 20, when detached from single elongated handle 12, can be used as a handheld brush in conjunction with a dustpan (not shown).

Each of the cleaning implements 13 includes a cleaning head 21 and a short hollow tubular handle or shaft 22 fixed to the cleaning head 21, with the distal end of short tubular handle 22 including an opening 24 along the side wall thereof. Preferably, opening 24 has an oval shape, although the present invention is not limited thereby.

Figure 13:
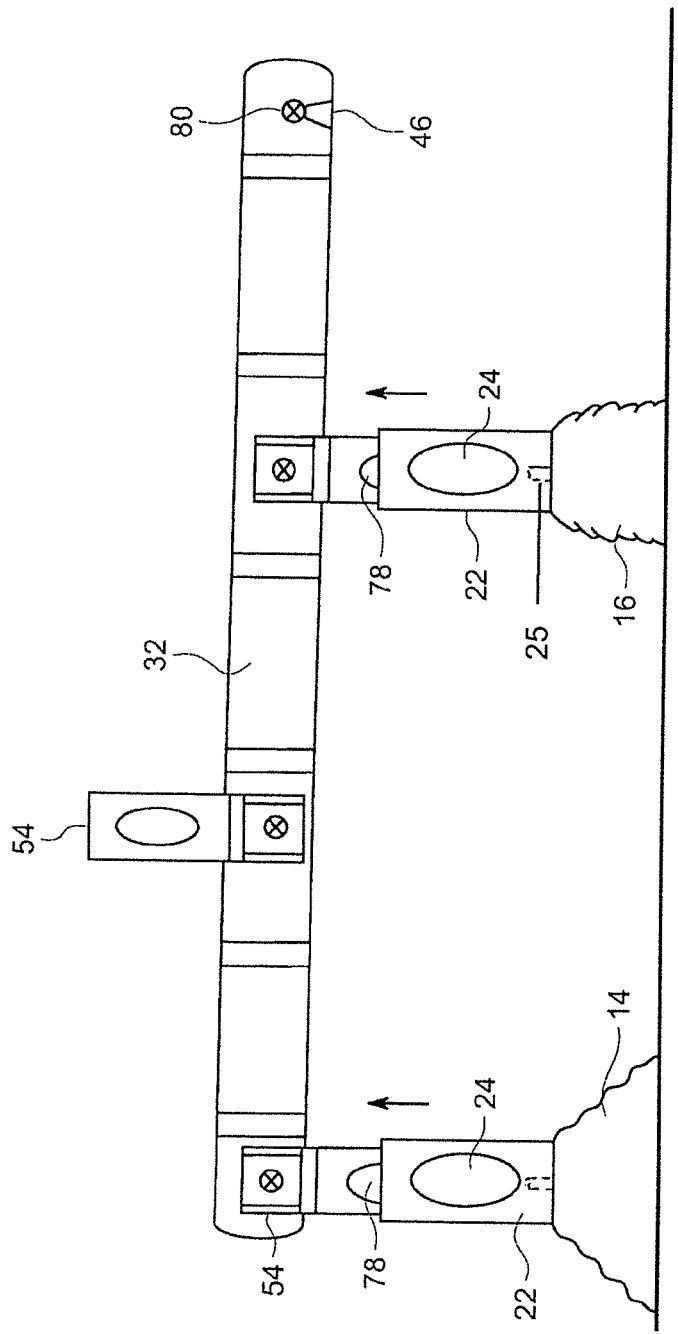
FIG. 13 is a front elevational view showing securement of the cleaning elements to the snap in posts.
Figure 13A:
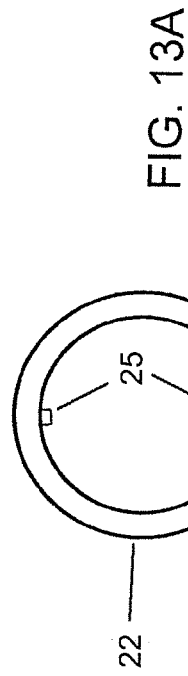
FIG. 13A is a top plan view of the hollow tubular handle of the cleaning implement.
Figure 14:
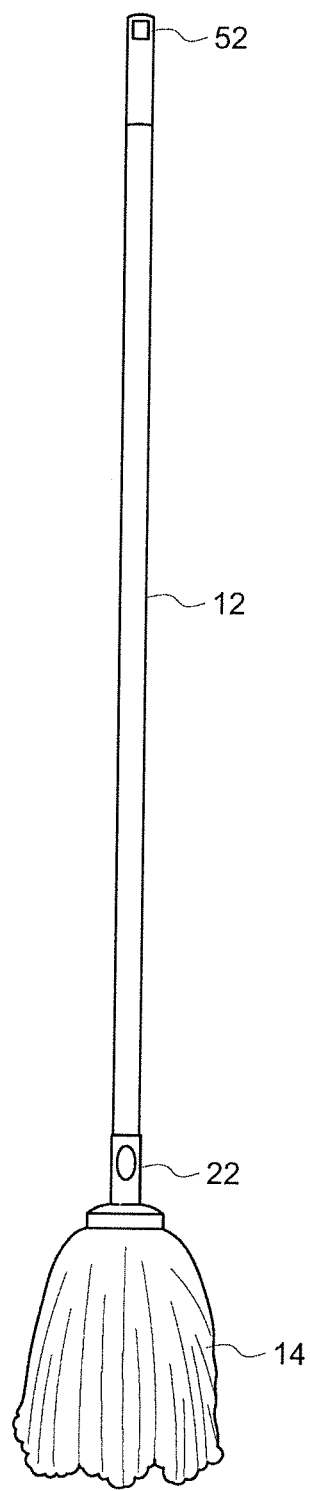
FIG. 14 is a front elevational view of the microfiber deck mop head secured to the single elongated handle.
Figure 15:
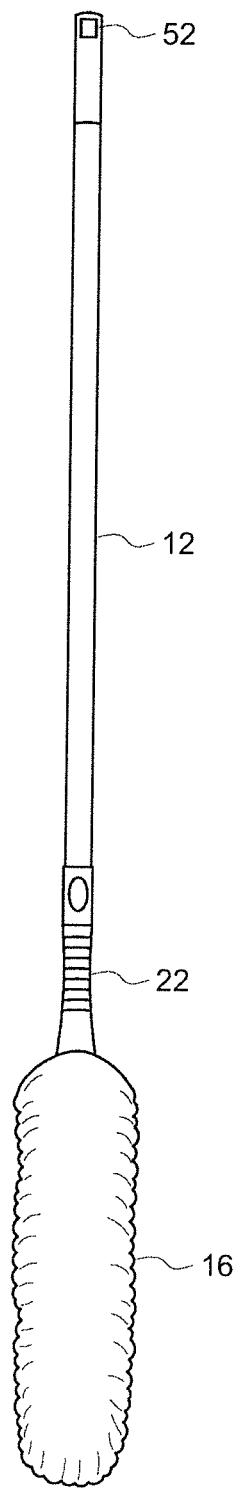
FIG. 15 is a front elevational view of the microfiber duster head secured to the single elongated handle.
Figure 16:
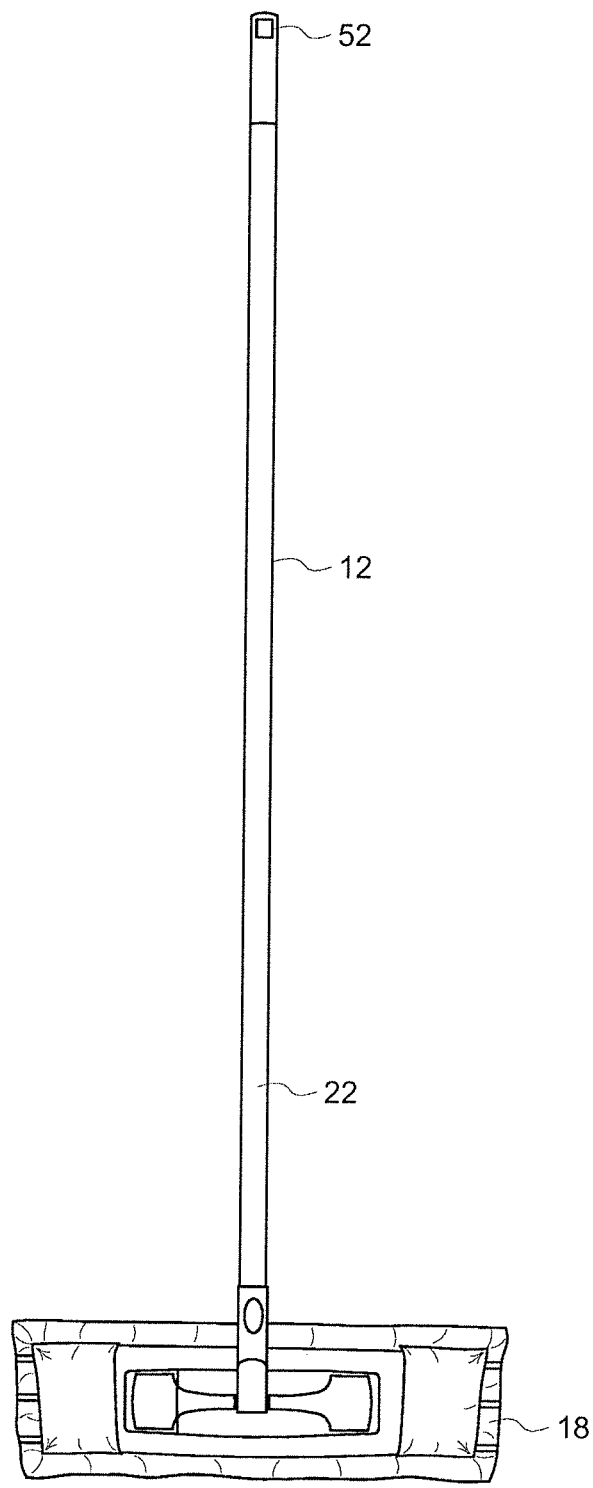
FIG. 16 is a front elevational view of the microfiber flat mop head secured to the single elongated handle.

In addition, hollow tubular handle 22 has diametrically opposite projections 25 at the inner surface thereof immediately below opening 24, as best shown in FIGS. 13 and 13A, the purpose for which will become apparent from the following description hereafter.

In accordance with an important aspect of the present invention, a storage rack 30 is provided for removably and detachably storing elongated handle 12 and cleaning elements 13. Storage rack 30 includes an elongated rectangular plate 32, preferably made of plastic. A plurality of openings 34 are provided in elongated rectangular plate 32 in spaced relation to each other. Three such openings 34 are shown in the drawings, although the present invention is not limited thereto. Preferably, each opening 34 has a generally square shape, although the present invention is not limited thereto. Although not required, each inner side wall 36 of each opening 34 preferably has two spaced apart raised sections 38 extending the height of the respective inner side wall 36, that is, in the depth direction of elongated rectangular plate 32, as best shown in FIG. 5.

Figure 1:
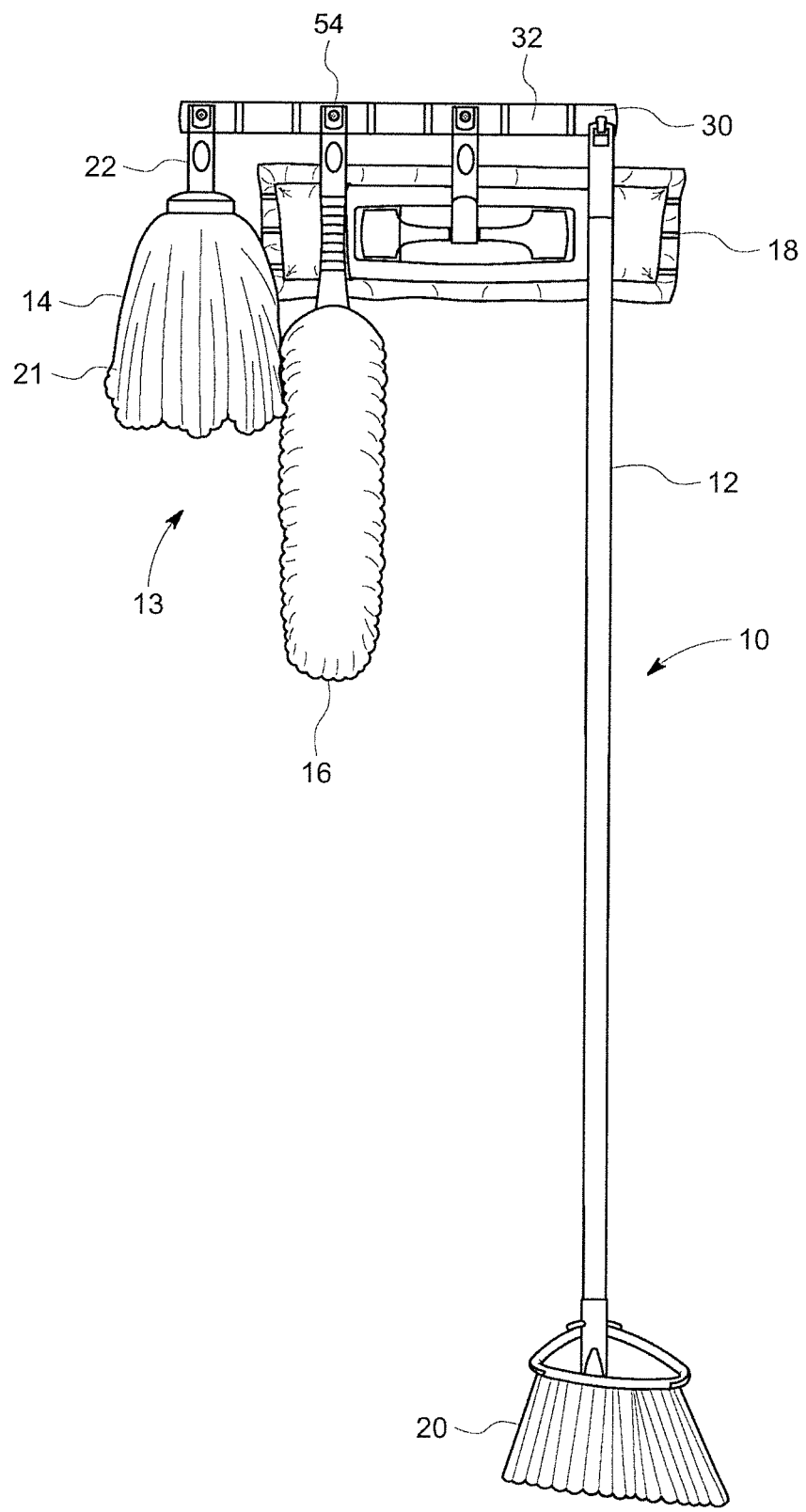
FIG. 1 is a perspective view of the storage rack according to the present invention with the interchangeable cleaning implements removably mounted thereto.
Figure 2:
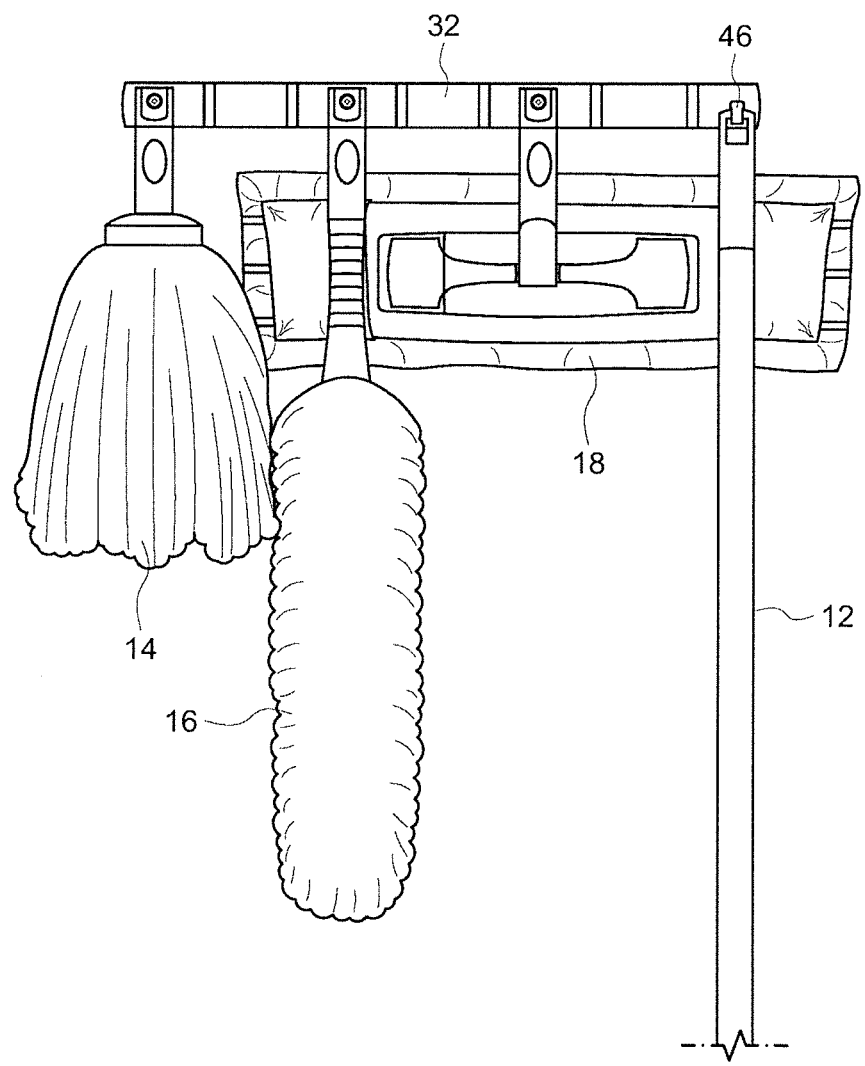
FIG. 2 is an enlarged perspective view of the storage rack according to the present invention with the interchangeable cleaning implements removably mounted thereto.
Figure 3:
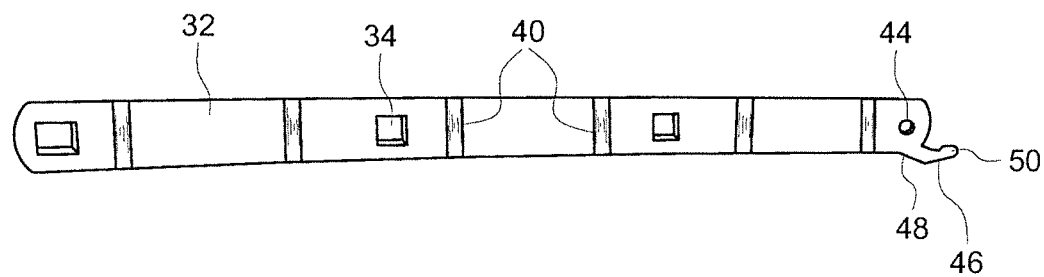
FIG. 3 is a front perspective view of the elongated rectangular plate.
Figure 4:
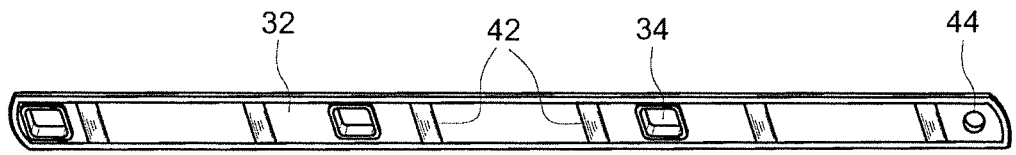
FIG. 4 is a rear perspective view of the elongated rectangular plate.
Figure 5:
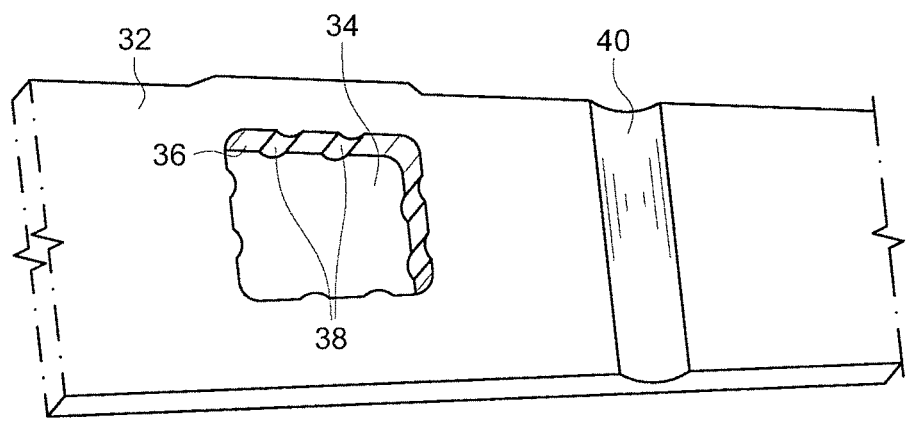
FIG. 5 is an enlarged front perspective view of a portion of the elongated rectangular plate.
Figure 6:
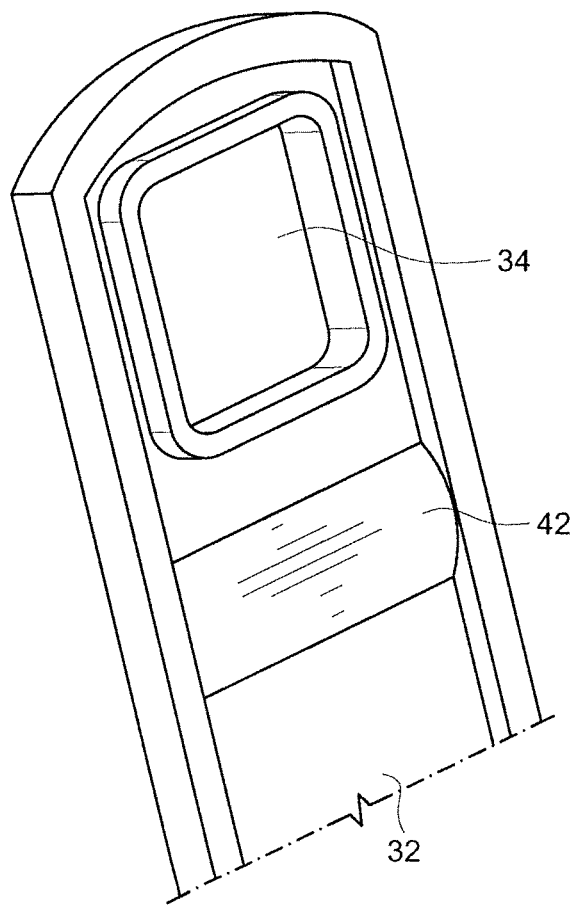
FIG. 6 is an enlarged rear perspective view of a portion of the elongated rectangular plate.
Figure 7:
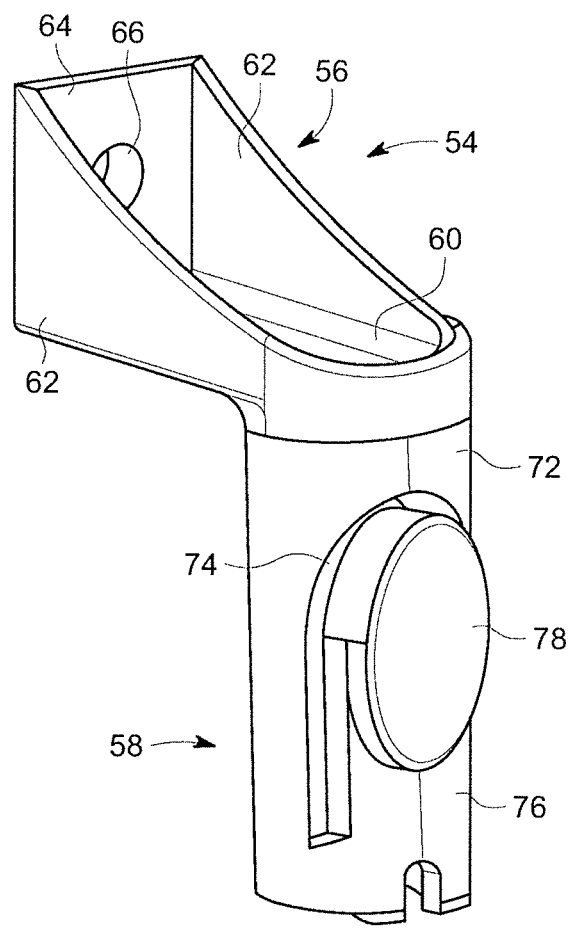
FIG. 7 is a front perspective view of a snap in post.

Preferably, there are a plurality of pushed in recesses 40, as best shown in FIG. 5, which are spaced apart in the lengthwise direction of elongated rectangular plate 32 and which extend the entire height of elongated rectangular plate 32. Such pushed in recesses 40 form outward bulges 42, best shown in FIG. 6, at the rear side of elongated rectangular plate 32. Such recesses 40 and bulges 42 function to increase the structural stability of elongated rectangular plate 32.

A circular opening 44 is provided at one end of elongated rectangular plate 32.

Further, a hook 46 extends outwardly from the front surface of elongated rectangular plate 32 at a position below circular opening 44. Hook 46 includes a first finger element 48 extending outwardly from the front surface of elongated rectangular plate 32 in a perpendicular manner, and a second finger element 50 connected to and extending slightly upwardly from the free end of first finger element 48.

In this regard, the upper end of single elongated handle 12 is provided with an opening 52 by which single elongated handle 12 can receive hook 46, and thereby be hung on storage rack 30.

Storage rack 30 further includes a plurality of snap in posts 54 which are adapted to be removably connected to elongated rectangular plate 32.

Each snap in post 54 has a generally L-shaped configuration with a plate securing section 56 and an implement securing section 58.

Specifically, plate securing section 56 includes a bottom wall 60 of a generally rectangular configuration. Two side walls 62 are provided, each connected to bottom wall 60 and extending upwardly therefrom, with each side wall 62 increasing in height from the forward end of bottom wall 60 to the rear end of bottom wall 60. A rear wall 64 extends upwardly from the rear end of bottom wall 60, with its side edges connected to the rear edges of side walls 62. A circular opening 66 is provided generally centrally of rear wall 64.

A square protuberance 70 extends rearwardly from the rear surface of rear wall 64, with circular opening 66 extending through square protuberance 70 as well. Square securing wall 70 is adapted to be press fit into a respective opening 34 of elongated rectangular plate 32, with raised sections 38 gripping the outer surfaces of square protuberance 70 to retain snap in posts 54 thereto with a friction fit.

In this regard, raised sections 38 aid in holding protuberances 70 in openings 34. Of course, it will be appreciated that, alternatively, raised sections 38 can be provided instead on the side walls of square protuberances 70.

Further, it will be appreciated that openings 34 and protuberances 70 are not limited to a square shape and can have any other shape, for example, circular, hexagonal, etc.

Alternatively, the rear surface of rear wall 64 can be provided with a circular boss in surrounding relation to circular opening 66, and in place of square protuberance 70, the rear surface of rear wall 64 can be provided with a square securing wall which extends rearwardly from the rear surface of rear wall 64, and in surrounding relation to the circular boss, with the square securing wall being adapted to be press fit into a respective opening 34 of elongated rectangular plate 32, so that raised sections 38 grip the outer surfaces of the square securing wall to retain snap in posts 54 thereto.

Implement securing section 58 includes a hollow tubular member 72 having one end fixed to the lower surface of bottom wall 60 at the front end thereof, so as to extend at a right angle to plate securing section 56.

An arcuate shaped cutout 74 is provided in hollow tubular member 72 along the length thereof. As a result, the portion of hollow tubular member 72 within the area of the cutout 74 forms a spring element 76 connected to hollow tubular member near the lower end thereof. The outer surface at the upper free end of spring element 76 is formed with an increased thickness to form a button 78 thereon that protrudes outwardly from said spring element 76. Button 78 preferably has the same oval shape and dimensions as opening 24. In other words, spring element 76 is formed in a cantilevered manner attached to the wall of the hollow tubular member. In this matter, a person can use a finger to press button 78 slightly inwardly with respect to tubular member 72.

Figure 8:
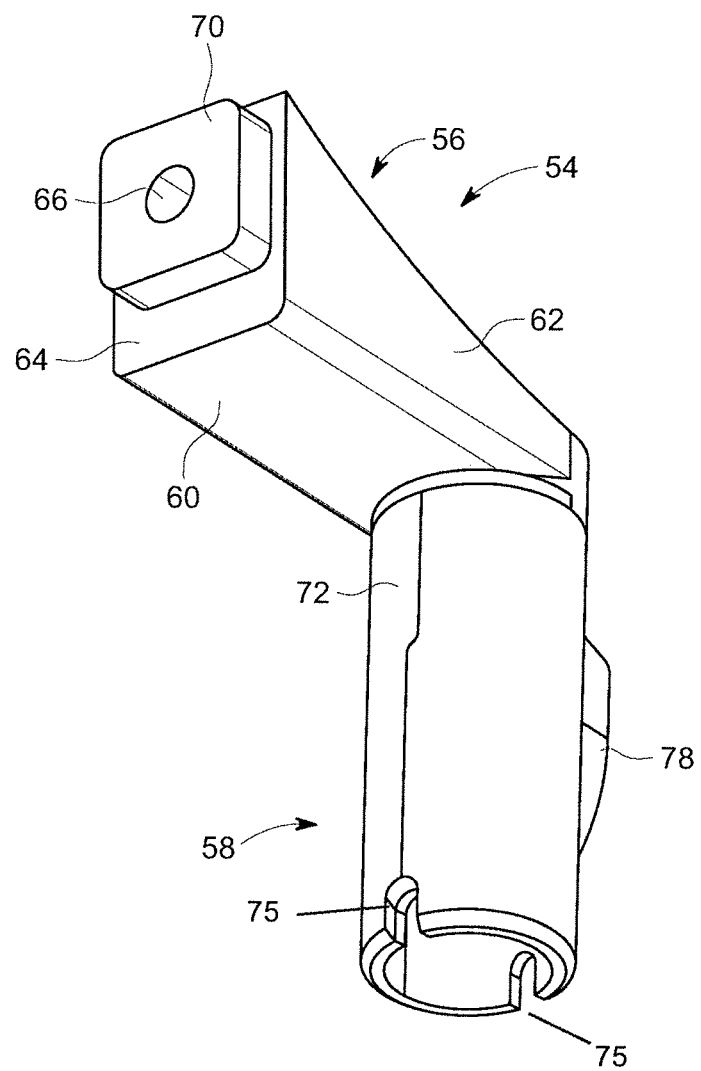
FIG. 8 is a rear perspective view of the snap in post.

In addition, the lower edge of tubular member 72 is preferably provided with two diametrically opposite recesses 75, as shown best in FIG. 8.

It will be appreciated that each snap in post 54 can be connected in a respective opening 34 of elongated rectangular plate 32 such that implement securing section 58 extends either upwardly or downwardly. Snap in posts 54 can be removed and reinserted to reorient the respective implement securing sections 58 upwardly or downwardly, or even sidewards.

Figure 9:
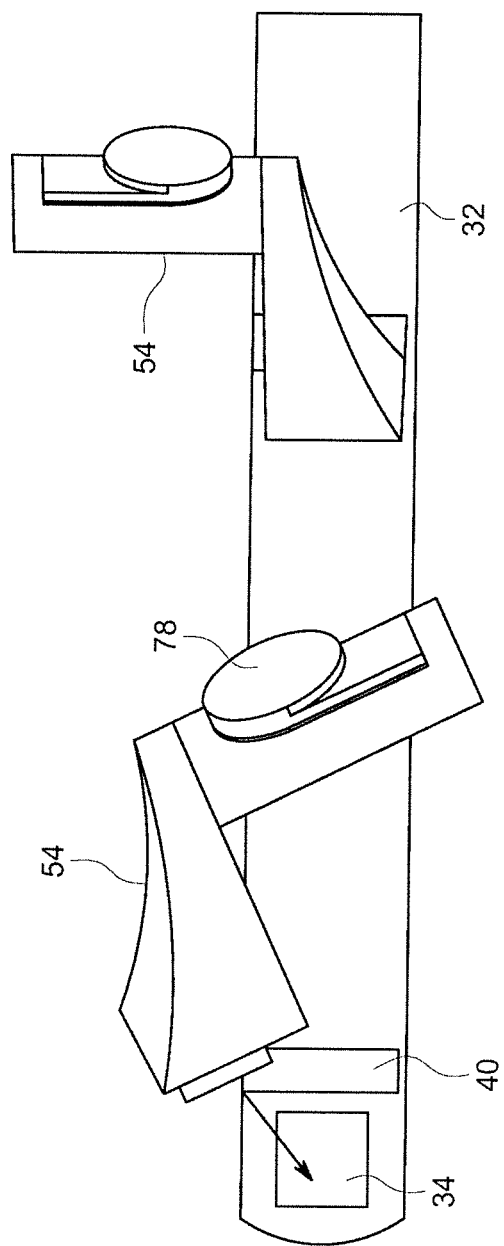
FIG. 9 is a front perspective view showing securement of the snap in posts to the elongated rectangular plate.
Figure 10:
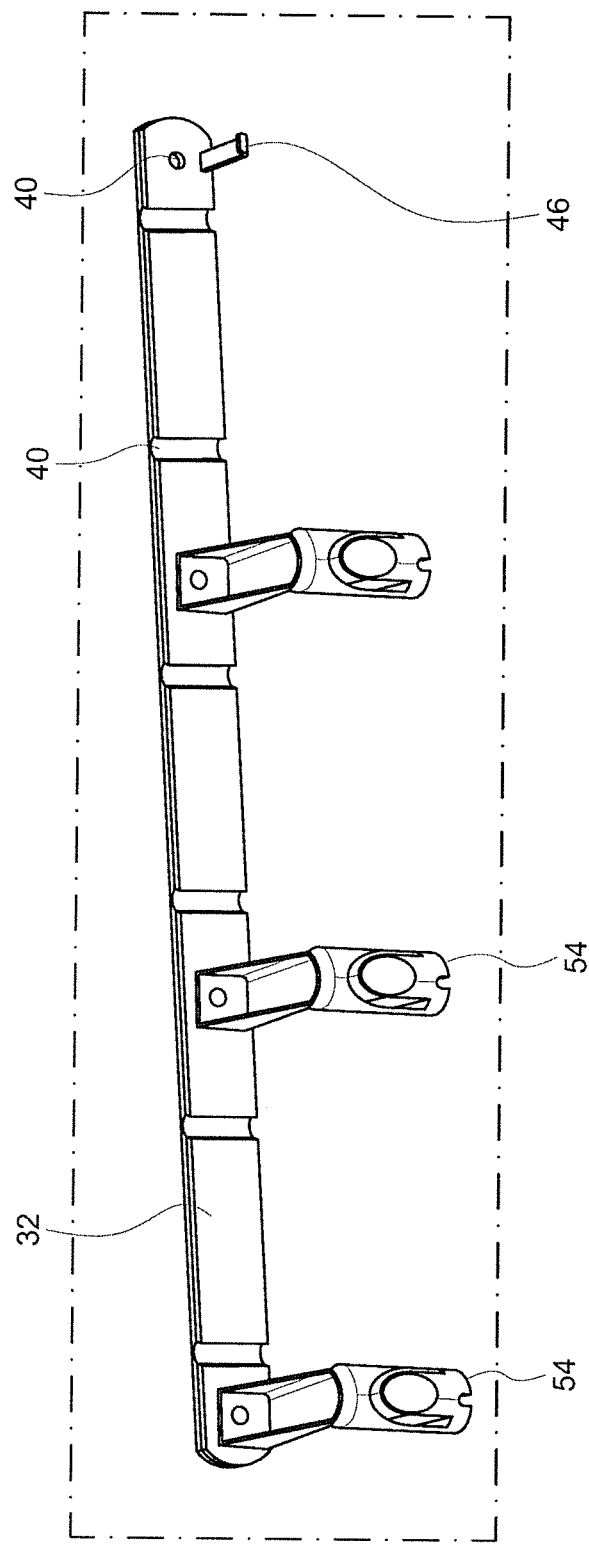
FIG. 10 is a front perspective view of the storage rack with the snap in posts secured to the elongated rectangular plate.
Figure 11:
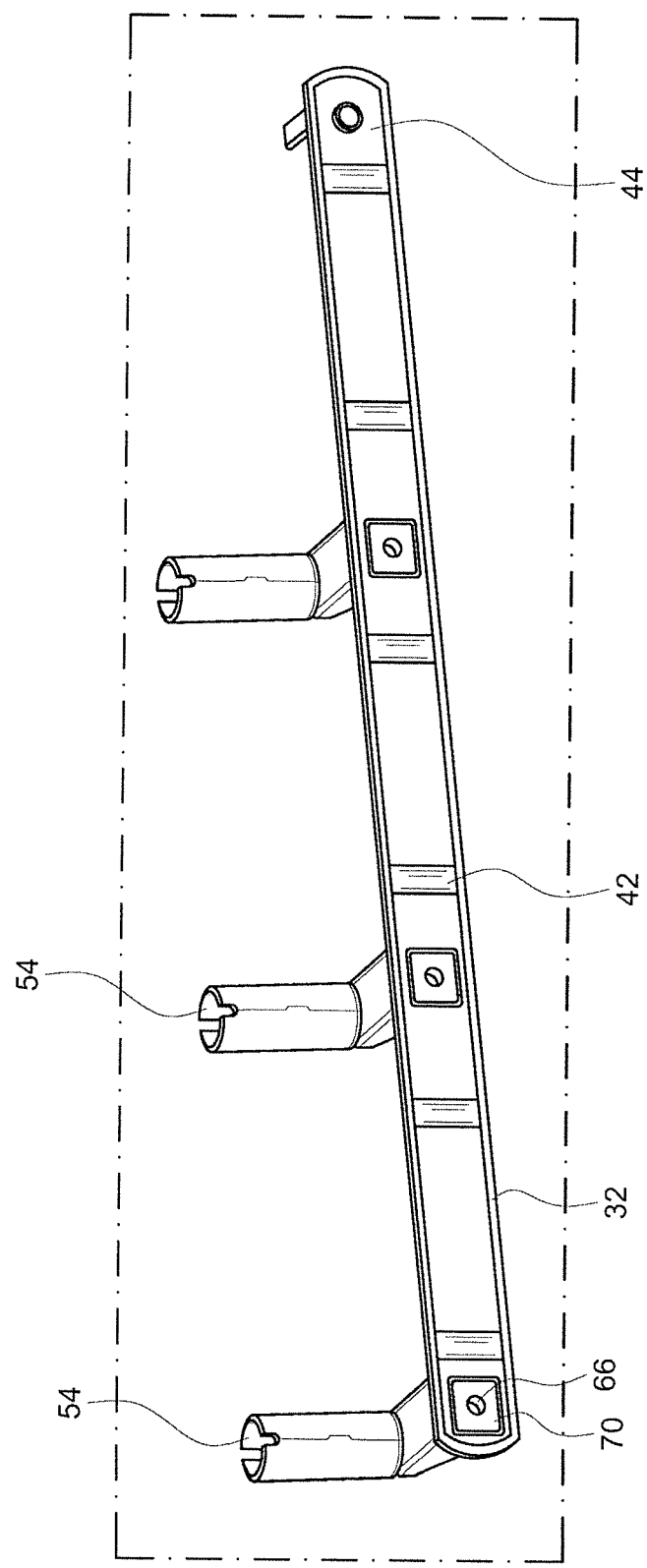
FIG. 11 is a rear perspective view of the storage rack with the snap in posts secured to the elongated rectangular plate.
Figure 12:
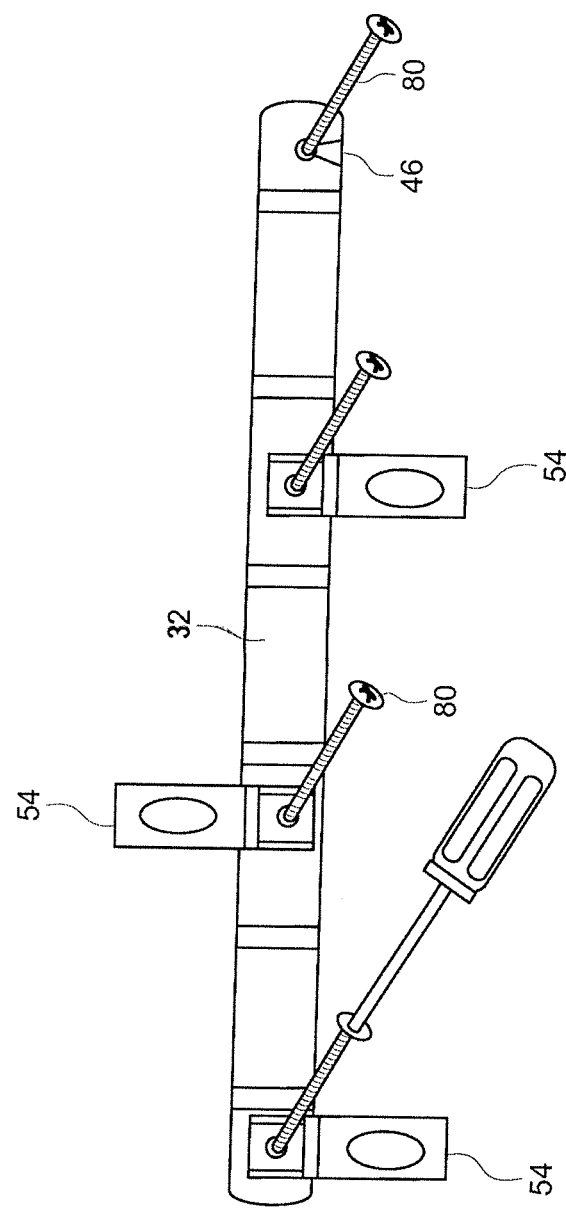
FIG. 12 is a front elevational view showing securement of the storage rack to a wall.

With this arrangement, snap in posts 54 are snap fit into respective openings 34 in elongated rectangular plate 32 such that the implement securing sections 58 preferably face either upwardly or downwardly, as shown in FIGS. 9-11. Then, elongated rectangular plate 32 is positioned horizontally against the wall and screws 80 are inserted through circular opening 44 and circular openings 66 into the wall to secure elongated rectangular plate 32 to the wall, as shown in FIG. 12. With this arrangement, each implement securing section 58 extends either upwardly or downwardly.

The short tubular handle 22 fixed to each cleaning implement 13 is then pushed over a respective hollow tubular member 72 of an implement securing section 58 until it abuts against an edge of button 78. At this point, as shown in FIG. 13, button 78 is pressed inwardly whereby short tubular handle 22 can be pushed further onto the respective hollow tubular member 72, with short tubular handle 22 retaining button 78 and spring element 76 in its pushed in position. As soon as button 78 reaches opening 24, it is no longer restrained by short tubular handle 22 and pops outwardly to be received in opening 24 in order to removably secure the respective cleaning element 13 to implement securing section 58.

In addition, during such operation, recesses 75 engage over projections 25 to further stabilize the arrangement and prevent wobbling movement of hollow tubular handle relative to hollow tubular member 72.

In order to remove a cleaning element 13, it is merely necessary to push in button 78 and remove the respective cleaning element 13.

In addition, the single elongated handle 12 can be hung on hook 46, as discussed above.

As discussed above, single elongated handle 12 can be formed by a plurality of handle elements which telescopically and removably snap into each other to form single elongated handle 12 as an elongated handle. The handle elements can be secured to each other in the same manner as cleaning elements 13 are removably secured to implement securing sections 58, that is, with the same openings and respective spring elements and pushbuttons.

When it is desired to use a different cleaning element 13, the respective cleaning element 13 is merely removed from its respective implement securing section 58, and snapped onto the end of single elongated handle 12, as shown in FIGS. 14-17.

It will be appreciated that various modifications can be made to the invention within the scope of the claims. For example, although elements 22 and 74 have been described as tubular, they can have any other cross-sectional shape other than circular, for example, square, hexagonal, etc.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An arrangement for interchangeably storing cleaning implements of a type having a cleaning head and a handle attached to the cleaning head, the arrangement comprising:
   a base adapted to be secured to a wall, and
   a plurality of cleaning implement attachments adapted to be secured to the base in a desired one of a plurality of orientations, each cleaning implement attachment including:
      a base securing section for securing the cleaning implement attachment to the base, the base securing section extending outwardly at an angle from the base, and
      an implement securing section fixed to the base securing section at an angle and extending one of upwardly or downwardly from the base securing section for removably engaging with the handle of one said cleaning implement to removably secure the one said cleaning implement to the base, the implement securing section including a tubular section selectively fixed in either of the following positions when the base securing section is secured to the base:
         a vertically oriented position extending upwardly from the base securing section or
         a vertically oriented position extending downwardly from the base securing section, and
      wherein the tubular section includes an arrangement for releasably holding one said cleaning implement in axial alignment with the tubular section.

2. An arrangement according to claim 1, wherein said implement securing section has a first hollow section with a first opening in a side wall thereof, with a spring biased button in the first opening, and each handle has a second hollow section adapted to slide over the first hollow section, the second hollow section having a second opening in a side wall thereof, for receiving the spring biased button when the second hollow section is slid over the first hollow section.

3. An arrangement according to claim 1, wherein said base includes a plurality of spaced apart openings therein, and each base securing section includes a protuberance for fitting within a respective one of said openings in said base.

4. An arrangement according to claim 3, wherein said openings in said base and said protuberances are dimensioned such that each protuberance fits in the respective one of said openings of said base with a friction fit.

5. An arrangement according to claim 3, wherein each opening in said base includes raised sections along an inner wall thereof for frictionally engaging with said protuberance.

6. An arrangement according to claim 1, wherein said base further includes a hook extending outwardly from a front face thereof.

7. An arrangement according to claim 1, wherein said angle is 90°.

8. An arrangement according to claim 1, wherein the cleaning implements are selected from one of the following:
- a wet mop head,
- a dry mop head,
- a duster head and
- a broom head.

9. An arrangement according to claim 1, further comprising an elongated handle adapted to be secured to any of the cleaning implements.

10. An arrangement according to claim 1,
- wherein the handle includes at least one projection at an inner wall thereof at a position below said second opening, and
- wherein said implement securing section has a lower edge with at least one recess for engaging said at least one projection to further stabilize the handle in said implement securing section.

11. An arrangement for interchangeably storing cleaning implements of a type having a cleaning head and a handle attached to the cleaning head, the arrangement comprising:
- a base adapted to be secured to a wall, and
- a plurality of cleaning implement attachments adapted to be secured to the base in a desired one of a plurality of orientations, each cleaning implement attachment including:
  - a base securing section for securing the cleaning implement attachment to the base, and
  - an implement securing section fixed to the base securing section for removably engaging with the handle of one said cleaning implement to removably secure the one said cleaning implement to the base,
- wherein said implement securing section has a first hollow section with a first opening in a side wall thereof, with a spring biased button in the first opening, and each handle has a second hollow section adapted to slide over the first hollow section, the second hollow section having a second opening in a side wall thereof, for receiving the spring biased button when the second hollow section is slid over the first hollow section, and
- wherein said first hollow section includes a spring element formed in said first opening in a cantilevered manner, with said button formed at a free end of said spring element.

12. An arrangement according to claim 11, wherein said button protrudes outwardly from said spring element.

13. An arrangement for interchangeably storing cleaning implements of a type having a cleaning head and a handle attached to the cleaning head, the arrangement comprising:
- a base adapted to be secured to a wall, and
- a plurality of cleaning implement attachments adapted to be secured to the base in a desired one of a plurality of orientations, each cleaning implement attachment including:
  - a base securing section for securing the cleaning implement attachment to the base, and
  - an implement securing section fixed to the base securing section for removably engaging with the handle of one said cleaning implement to removably secure the one said cleaning implement to the base,
- wherein said base includes a plurality of spaced apart openings therein, and each base securing section includes a protuberance for fitting within a respective opening in said base, and
- wherein each base securing section includes a supporting wall to which the respective protuberance is mounted, and a through bore extends through the supporting wall and protuberance for receiving a fastening element therethrough which is adapted to extend through the respective one of said openings of the base to secure the base securing section to the base and to the wall, after the cleaning implement attachment has been oriented in a desired one of the plurality of orientations relative to the base.

* * * * *